D. BLOOM.
RECEPTACLE FOR AN ARTICLE OF FOOD.
APPLICATION FILED OCT. 28, 1915.

1,232,485.
Patented July 10, 1917.

WITNESS
J. B. Gardner.

INVENTOR.
DAVID BLOOM
BY White & Prost
HIS ATTORNEYS.

UNITED STATES PATENT OFFICE.

DAVID BLOOM, OF BERKELEY, CALIFORNIA.

RECEPTACLE FOR AN ARTICLE OF FOOD.

1,232,485.   Specification of Letters Patent.   Patented July 10, 1917.

Application filed October 28, 1915. Serial No. 58,338.

*To all whom it may concern:*

Be it known that I, DAVID BLOOM, a citizen of the United States, and a resident of Berkeley, county of Alameda, State of California, have invented a certain new and useful Receptacle for an Article of Food, of which the following is a specification.

The invention relates to a receptacle for food products and particularly to a receptacle for preserved fruits and the like.

An object of the invention is to provide a receptacle in which the individual pieces preserved therein are in large degree separately supported so that the weight of the pieces in the upper portion of the container will not crush the pieces underneath.

Another object of the invention is to provide a receptacle which will present an attractive appearance and favorably display the contents.

A further object of the invention is to provide a receptacle of the kind described in which it is easy to pack or withdraw the contents.

When fruits and the like are preserved and sealed in a can or jar, the lower pieces support the weight of the upper pieces which tend to distort and crush them and their appearance is thereby injured. It is therefore an object of my invention to prevent this crushing of the lower portion of the contents of the container by providing on the inside wall of the container supports which carry the weight of the individual pieces of the contents so that any pressure between the pieces is of negligible amount and the softest of fruits are preserved intact in their original form. In the drawings I have shown my invention as embodied in a glass jar and I shall describe it in that form, but it is obvious that it may be also embodied in a can or jar of other kind than glass.

Referring to the drawings.

Figure 1:
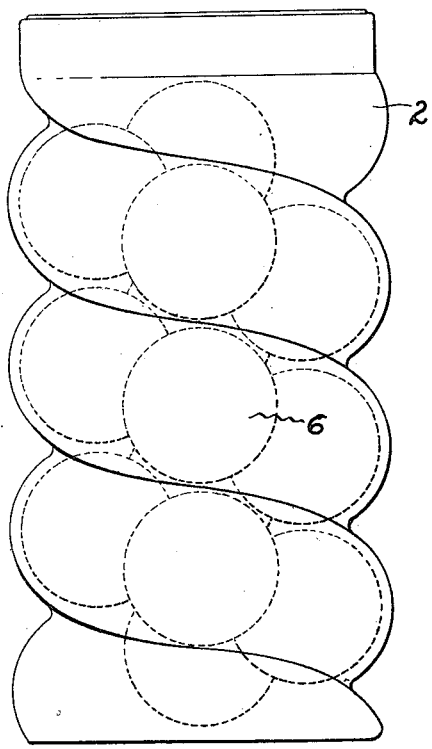
Figure 1 is a view of a glass jar of my invention showing how the preserved articles are packed therein. The cover of the jar is not shown.
Figure 2:
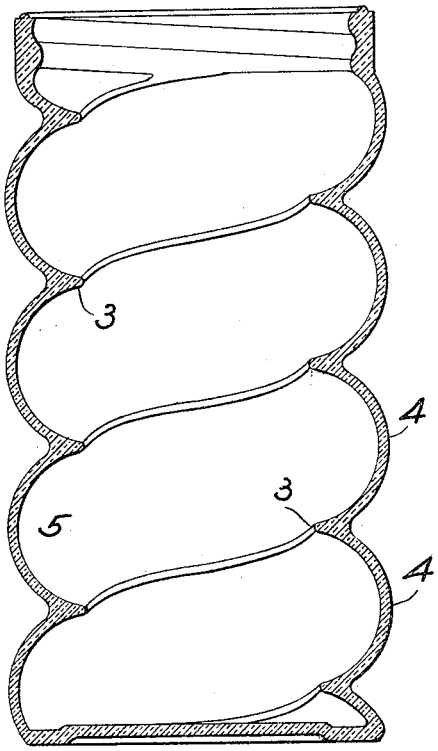
Fig. 2 is a sectional view taken on a vertical plane through the center of the jar.
Figure 3:
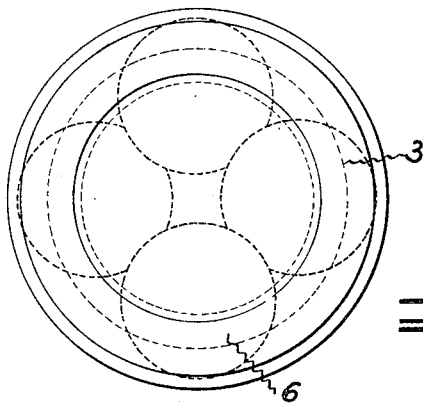
Fig. 3 is a bottom view of Fig. 1.

My invention consists of a jar or other receptacle 2 provided on its interior lateral surface with spirally or helically disposed ridges or ledges 3 forming a helically or spirally disposed groove therebetween running from the top to the bottom of the jar. The receptacle may be made with a single groove or two or more grooves may be used after the manner of a double or multiple thread, depending somewhat upon the approximate size of the articles to be preserved, but more upon the size of the jar. In effect, the ledge and the groove form a sort of shelf upon which the articles being preserved are packed and which in large degree support their weight, the contact between the individual pieces of contents being only such as to retain the pieces on the grooves. There is therefore little or no tendency of the contents to crush or distort the individual pieces in the lower portion of the receptacle and the softest and most easily crushed fruits may be packed in these receptacles without injury to substance or form.

Preferably the ridges 3 are formed by the curving inward of the walls 4, the outside surface following the contour of the inside surface. Preferably also the curvature of the groove is circular in section, but it is to be understood that these are details of my preferred embodiment and that my invention is not to be limited to such details, for I may adopt many variations within the scope of my invention as defined by the claim succeeding this description.

The extent inwardly toward the center of the receptacle of the ledges 3; that is, the depth of the groove 5, should be sufficient to give the contemplated support to the contents without being so great as to interfere with the packing of the pieces into the receptacle.

In packing the contents into the receptacle of my invention, the individual pieces 6 are introduced into the receptacle adjacent to their final position, then placed in the groove above the preceding piece and pushed down into place. In withdrawing the contents from the receptacle these steps are reversed. It will be seen, therefore, that the pieces are quickly and readily positioned in the receptacle or withdrawn therefrom without deformation or injury.

I claim:

A receptacle for preserved food having a spirally disposed ledge upon its inner surface, the maximum diameter of the jar being less than three times the pitch of the spiral.

In testimony whereof, I have hereunto set my hand at New York city, New York, this 27th day of October, 1915.

DAVID BLOOM.

In presence of—
A. G. THAANUM.